United States Patent
Seo et al.

(10) Patent No.: US 9,844,036 B2
(45) Date of Patent: Dec. 12, 2017

(54) DATA TRANSMISSION METHOD FOR TERMINAL IN A WIRELESS COMMUNICATION SYSTEM, AND TERMINAL USING THE METHOD

(71) Applicant: LG ELECTRONICS INC., Seoul (KR)

(72) Inventors: Dongyoun Seo, Seoul (KR); Bonghoe Kim, Seoul (KR); Joonkui Ahn, Seoul (KR); Hanbyul Seo, Seoul (KR); Hyangsun You, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 22 days.

(21) Appl. No.: 14/758,947

(22) PCT Filed: Jan. 2, 2014

(86) PCT No.: PCT/KR2014/000014
§ 371 (c)(1),
(2) Date: Jul. 1, 2015

(87) PCT Pub. No.: WO2014/107030
PCT Pub. Date: Jul. 10, 2014

(65) Prior Publication Data
US 2015/0351092 A1  Dec. 3, 2015

Related U.S. Application Data

(60) Provisional application No. 61/766,115, filed on Feb. 18, 2013, provisional application No. 61/748,129, filed on Jan. 2, 2013.

(51) Int. Cl.
*H04W 72/04* (2009.01)
*H04W 4/00* (2009.01)
(Continued)

(52) U.S. Cl.
CPC ....... *H04W 72/0413* (2013.01); *H04L 5/0046* (2013.01); *H04L 5/0048* (2013.01);
(Continued)

(58) Field of Classification Search
CPC ............ H04W 72/04; H04W 72/0406; H04W 72/0413; H04W 4/005; H04W 72/0446;
(Continued)

(56) References Cited

U.S. PATENT DOCUMENTS

| 2011/0038271 A1 | 2/2011 | Shin et al. |
| 2012/0106407 A1* | 5/2012 | Papasakellariou ...... H04L 5/001 370/280 |

(Continued)

FOREIGN PATENT DOCUMENTS

| EP | 2 458 925 A1 | 5/2012 |
| WO | 2011-084821 A2 | 7/2011 |
| WO | 2012-036704 A1 | 3/2012 |

OTHER PUBLICATIONS

3rd Generation Partnership Program; Technical Specification Group Radio Access Network; Evolved Universal Terrestrial Radio Access (E-UTRA); Physical layer procedures (Release 11), 3GPP TS 36.213. V11.1.0 (Dec. 2012).

*Primary Examiner* — Kwang B Yao
*Assistant Examiner* — Syed M Bokhari
(74) *Attorney, Agent, or Firm* — Dentons US LLP

(57) ABSTRACT

Provided are a data transmission method for a terminal in a wireless communication system, and a terminal using the method. The terminal determines the number of information bits transmitted via a physical uplink shared channel (PUSCH), determines the energies respectively distributed to a reference signal and data comprising the information
(Continued)

bits in accordance with the number of information bits, and transmits the reference signal and the data at the respective determined energies.

5 Claims, 11 Drawing Sheets

(51) Int. Cl.
   *H04L 5/00* (2006.01)
   *H04L 5/14* (2006.01)
(52) U.S. Cl.
   CPC ........... *H04L 5/0053* (2013.01); *H04W 4/005* (2013.01); *H04L 5/001* (2013.01); *H04L 5/0023* (2013.01); *H04L 5/0035* (2013.01); *H04L 5/0094* (2013.01); *H04L 5/14* (2013.01); *H04W 72/0446* (2013.01)
(58) Field of Classification Search
   CPC ... H04L 5/0048; H04L 5/0046; H04L 5/0053; H04L 5/0023; H04L 5/0094; H04L 5/0035
   USPC .................................................. 370/329, 336
   See application file for complete search history.

(56) References Cited

U.S. PATENT DOCUMENTS

| | | | |
|---|---|---|---|
| 2012/0281650 A1* | 11/2012 | Ouchi ................... | H04W 52/04 370/329 |
| 2012/0300727 A1* | 11/2012 | Kim .................... | H04W 52/146 370/329 |
| 2012/0327885 A1* | 12/2012 | Chung .................. | H04L 1/1614 370/329 |
| 2013/0058315 A1* | 3/2013 | Feuersanger ....... | H04W 52/281 370/336 |
| 2013/0230004 A1* | 9/2013 | Nam ....................... | H04L 5/001 370/329 |

* cited by examiner

DATA TRANSMISSION METHOD FOR TERMINAL IN A WIRELESS COMMUNICATION SYSTEM, AND TERMINAL USING THE METHOD

This application is a 35 U.S.C. §371 National Stage Entry of International Application No. PCT/KR2011/000014 filed Jan. 2, 2014, which claims benefit of and priority to U.S. Provisional Application Nos. 61/748,129 filed Jan. 2, 2013 and 61/766,115 filed Feb. 18, 2013, all of which are incorporated by reference for all purposes as if fully set forth herein.

BACKGROUND OF THE INVENTION

Field of the Invention

The present invention relates to wireless communication and, more particularly, to data transmission method for a terminal in a wireless communication system, and a terminal using the method.

Related Art

In a next-generation wireless communication system, machine type communication (MTC) terminals may be used. MTC terminals refer to low-priced/low specification terminals focusing on data communication such as reading a meter, measuring a water level, utilizing a monitoring camera, and reporting vending machine inventory.

An MTC terminal may perform data transmission a plurality of times through one-time uplink scheduling. For example, the MTC terminal may receive scheduling information called uplink grant in a first subframe and transmit uplink data in second to Nth subframes (N>2). This transmission scheme is called subframe bundling. Subframe bundling is one of methods for increasing coverage.

Uplink data is transmitted via an uplink data channel. Here, a reference signal is also transmitted together through the uplink data channel for the purpose of decoding the uplink data. In a related art wireless communication system, a position/transmission power of a reference signal, which is transmitted via an uplink data channel, in radio resource has been defined, but the position/transmission power of a reference signal in radio resource does not consider an amount of uplink data more specifically than the uplink data.

In a case in which an MTC terminal transmits uplink data through subframe bundling, in how a radio resource/transmission power to which a reference signal is allocated is to be determined to transmit the uplink data and the reference signal may be problematic.

SUMMARY OF THE INVENTION

The present invention provides a data transmission method for a terminal in a wireless communication system and a terminal using the method.

In an aspect, provided is a data transmission method for a terminal in a wireless communication system. The data transmission method includes determining the number of information bits transmitted via a physical uplink shared channel (PUSCH), determining energy to be distributed to each of data including the information bits and a reference signal according to the number of information bits and transmitting the data and the reference signal with each of the determined energy.

In another aspect, provided is a terminal. The terminal includes a radio frequency (RF) unit configured to transmit and receive a wireless signal and a processor connected to the RF unit. The processor determines the number of information bits transmitted via a physical uplink shared channel (PUSCH); determines energy to be distributed to each of data including the information bits and a reference signal according to the number of information bits; and transmits the data and the reference signal with each of the determined energy.

According to the present invention, radio resource/transmission power to which a reference signal is allocated may be determined according to the number of information bits of uplink data transmitted in an uplink data channel. Since a structure of an uplink data channel is determined in consideration of an amount of data and SNR, uplink transmission may be effectively performed.

DESCRIPTION OF EXEMPLARY EMBODIMENTS

LTE (Long Term Evolution) according to 3GPP (3rd Generation Partnership Project), a part of E-UMTS (Evolved-UMTS) using E-UTRAN (Evolved-Universal Terrestrial Radio Access Network), employs OFDMA (Orthogonal Frequency Division Multiple Access) in downlink and SC-FDMA (Single Carrier-Frequency Division Multiple Access) in uplink. LTE-A (Advanced) is an evolved LTE. Hereinafter, the 3GPP LTE/LTE-A will be largely described to clarify the description of the present invention, but a technical concept of the present invention is not limited thereto.

A wireless device may be fixed or mobile and may be called by other names such as UE (User Equipment), MS (mobile station), MT (mobile terminal), UT (user terminal), SS (subscriber station), PDA (personal digital assistant), wireless modem, or handheld device. Also, the wireless device may be a device supporting only data communication like a MTC (Machine-Type Communication) device.

A base station (BS) generally refers to a fixed station communicating with a wireless device, and may be called by other names such as eNB (evolved-NodeB), BTS (Base Transceiver System), and access point.

A wireless device may be served by a plurality of serving cells. Each serving cell may be defined by a downlink component carrier (DL CC) or a pair of DL CC and uplink component carrier (UL CC).

A serving cell may be classified into a primary cell and a secondary cell. The primary cell operates in a primary frequency, performs an initial connection establishment process, or initiates a connection reestablishment process, or a cell designated as a primary cell during a handover process. The primary cell is also called a reference cell. The secondary cell may operate in a secondary frequency, may be set after a radio resource control (RRC) connection is established, and may be used to provide additional radio resource. At least one primary cell may be set all the time and the secondary cell may be added/corrected/released by higher layer signaling (e.g., RRC message).

A cell index (CI) of the primary cell may be fixed. For example, the lowest CI may be designated as a CI of the primary cell. Hereinafter, a CI of the primary cell is 0, and as a CI of the secondary cell, numbers, starting from 1, may be sequentially allocated.

Figure 1:
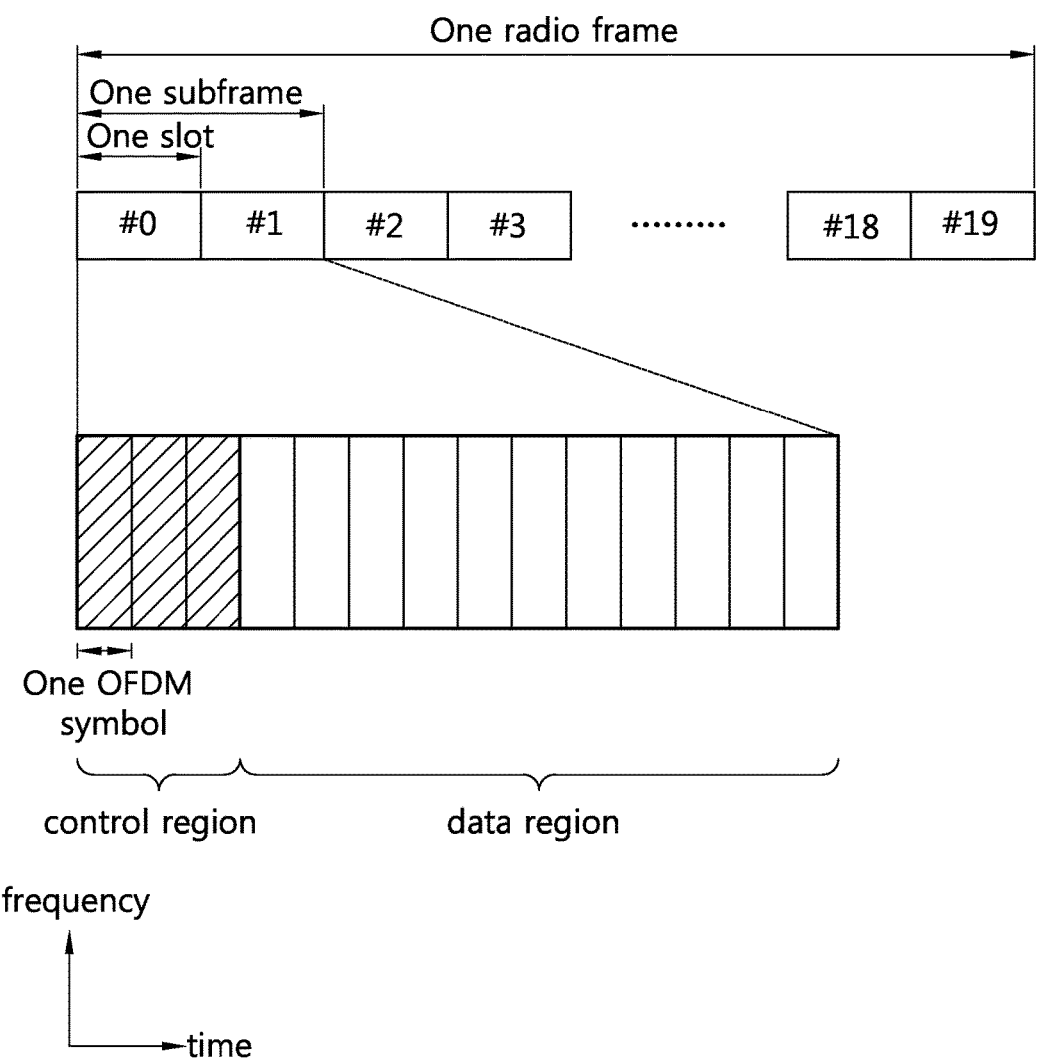
FIG. 1 illustrates a structure of a DL radio frame in 3GPP LTE-A.

FIG. 1 illustrates a structure of a DL radio frame in 3GPP LTE-A. This may refer to paragraph 6 of 3GPP TS 36.211 V10.2.0 (2011 June) "Evolved Universal Terrestrial Radio Access (E-UTRA); Physical Channels and Modulation (Release 10)".

A radio frame includes 10 subframes indexed with 0 to 9. A single subframe includes two contiguous slots. A time taken for a single subframe to be transmitted is called a transmission time interval (TTI). A length of a signal subframe is 1 ms, and a length of a single slot may be 0.5 ms.

A single slot may include a plurality of orthogonal frequency division multiplexing (OFDM) symbols in a time domain. Since 3GPP LTE uses orthogonal frequency division multiple access (OFDMA) in downlink (DL), the OFDM symbols merely expresses a single symbol period and there is no limitation in a multi-access scheme or a title. For example, the OFDM symbol may be referred to by other name such as a single carrier-frequency division multiple access (SC-FDMA) symbol, or a symbol interval.

A single slot is illustrated to include seven OFDM symbols, but the number of OFDM symbols included in a single slot may be varied according to lengths of a cyclic prefix (CP). According to 3GPP TS 36.211 V10.2.0, in a normal CP, one slot includes seven OFDM symbols, and in an extended CP, one slot includes six OFDM symbols.

A resource block (RB) is a resource allocation unit and includes a plurality of subcarriers in one slot. A resource, which is configured as a single OFDM symbol in a time domain and which is configured as a single subcarrier in a frequency domain is called a resource element RE. For example, when a resource block includes seven OFDM symbols in the time domain and twelve subcarriers in the frequency domain, the single resource block may include (7×12) number of resource elements RE. A resource block may be classified into a physical resource block (PRB) and a virtual resource block (VRB). The PRB includes contiguous subcarriers, and the VRB may include non-contiguous subcarriers.

Figure 2:
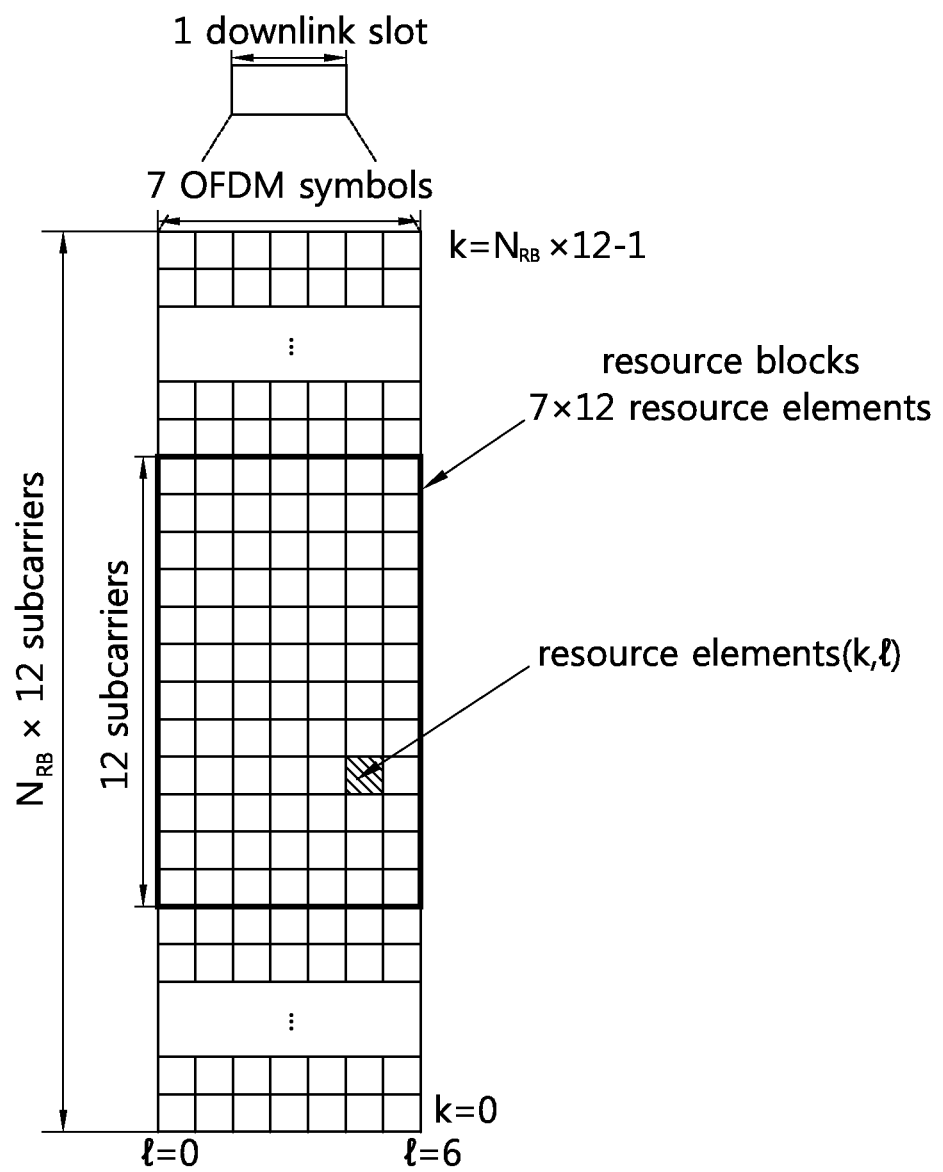
FIG. 2 is a view illustrating an example of a resource grid of a downlink slot.

FIG. 2 is a view illustrating an example of a resource grid of a downlink slot.

Referring to FIG. 2, the downlink slot includes a plurality of OFDM symbols in the time domain, and $N_{RB}$ number of resource blocks in the frequency domain. A resource block, as a resource allocation unit, includes one slot in the time domain and a plurality of contiguous subcarriers in the frequency domain. The $N_{RB}$ number of resource blocks included in the downlink slot is dependent upon a downlink transmission bandwidth set in a cell. For example, in an LTE system, $N_{RB}$ may be any one of 6 to 110. A structure of an uplink slot may be identical to that of the downlink slot. However, in an uplink slot, an OFDM symbol may be called an SC-FDMA slot.

Each element of a resource grid is called a resource element (RE). The resource elements of the resource grid may be identified by a pair of indices (k,l) in the slot. Here, k ($k=0, \ldots, N_{RB} \times 12-1$) is a subcarrier index in the frequency domain, and l ($l=0, \ldots, 6$) is an OFDM symbol index in the time domain.

In FIG. 2, it is illustrated that one resource block includes 7×12 resource elements composed of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on a length of a cyclic prefix (CP), frequency spacing, and the like. One of 128, 256, 512, 1024, 1536, and 2048 may be selectively used as the number of subcarriers in a single OFDM symbol.

A downlink (DL) subframe is divided into a control region and a data region in the time domain. The control region includes a maximum of four front OFDM symbols of a first slot in a subframe, but the number of OFDM symbol included in the control region may vary. A physical downlink control channel (PDCCH) and other control channels are allocated to the control region, and a PDSCH is allocated to the data region.

As presented in 3GPP TS 36.211 V10.2.0, in 3GPP LTE/LTE-A, physical channels include a physical downlink control channel (PDCCH), a physical control format indicator channel (PCFICH), and a physical hybrid-ARQ indicator channel (PHICH).

The PCFICH transmitted in a first OFDM symbol of a subframe carries a control format indicator (CFI) regarding the number (namely, a size of a control region) of OFDM symbols used to transmit control channels. A wireless device first receives the CFI on a PCFICH and subsequently monitors a PDCCH.

Unlike the PDCCH, the PCFICH is transmitted through a fixed PCFICH resource of a subframe, without using blind decoding.

The PHICH carries an ACK (positive-acknowledgement)/NACK (negative-acknowledgement) signal for an uplink hybrid automatic repeat request (HARQ) process. An ACK/NACK signal with respect to UL data on a PUSCH transmitted by a wireless device is transmitted on the PHICH.

A physical broadcast channel (PBCH) is transmitted in four front OFDM symbols of a second slot of a first subframe of a radio frame. The PBCH carries system information essential for the wireless device to communicate with a BS, and system information transmitted through the PBCH is called a master information block (MIB). In comparison therewith, system information transmitted on a PDSCH indicated by a PDCCH is called a system information block (SIB).

Control information transmitted through the PDCCH is called downlink control information (DCI). The DCI includes resource allocation of the PDSCH (it is also called a downlink (DL) grant), resource allocation of the PUSCH (it is also called uplink (UL) grant), an aggregation of transmission power control command with respect to individual UEs of a certain UE group and/or activation of voice over Internet protocol (VoIP).

A BS determines a PDCCH format according to a DCI to be transmitted to a wireless device, adds a CRC to the DCI, and subsequently masks a unique identifier (it is called a radio network temporary identifier (RNTI)) according to an owner or a purpose of the PDCCH to the CRC.

In case of a PDCCH for a specific wireless device, a unique identifier of the wireless device, for example, a cell-RNTI (C-RNTI), may be masked to the CRC. Alternatively, in case of a PDCCH for a paging message, a paging indication identifier, for example, a paging-RNTI (P-RNTI), may be masked to the CRC. In case of a PDCCH for system information, a system information identifier, for example, system information-RNTI (SI-RNTI), may be masked to the CRC. In order to indicate a random access response as a response with respect to transmission of a random access preamble, a random access-RNTI (RA-RNTI) may be masked to the CRC. In order to indicate a transmit power control (TPC) command with respect to a plurality of wireless devices, a TPC-RNTI may be masked to the CRC. To a PDCCH for semi-persistent scheduling (SPS), an SPS-C-RNTI may be masked to the CRC.

When the C-RNTI is used, the PDCCH may carry control information (which is called a UE-specific control information) for a specific wireless device, and when other RNTI is used, the PDCCH carries common control information that every or a plurality of wireless devices within a cell is or are to receive.

The CRC-added DCI is encoded to generate coded data. Encoding includes channel encoding and rate matching. The coded data is modulated to generate modulation symbols. The modulation symbols are mapped to a physical resource element (RE).

The control region of a subframe includes a plurality of control channel elements (CCES). A CCE, a logical allocation unit used to provide a coding rate according to a state of a wireless channel to a PDCCH, corresponds to a plurality of resource element groups (REGs). The REGs include a plurality of resource elements. A format of a PDCCH and the number of bits of an available PDCCH are determined according to correlation between the number of CCEs and the coding rate provided by the CCEs.

One REG includes four REs, and one CCE includes nine REGs. In order to configure a PDCCH, {1, 2, 4, 8} number of CCEs may be used, and each element of {1, 2, 4, 8} is called a CCE aggregation level.

The number of CCEs used for transmission of a PDDCH is determined by a BS according to a channel status. For example, for a wireless device having a good DL channel status, one CCE may be used for transmission of PDCCH.

A control channel including one or more CCEs performs interleaving in units of REGs, and is mapped to a physical resource after a cell identifier-based cyclic shift is performed.

Figure 3:
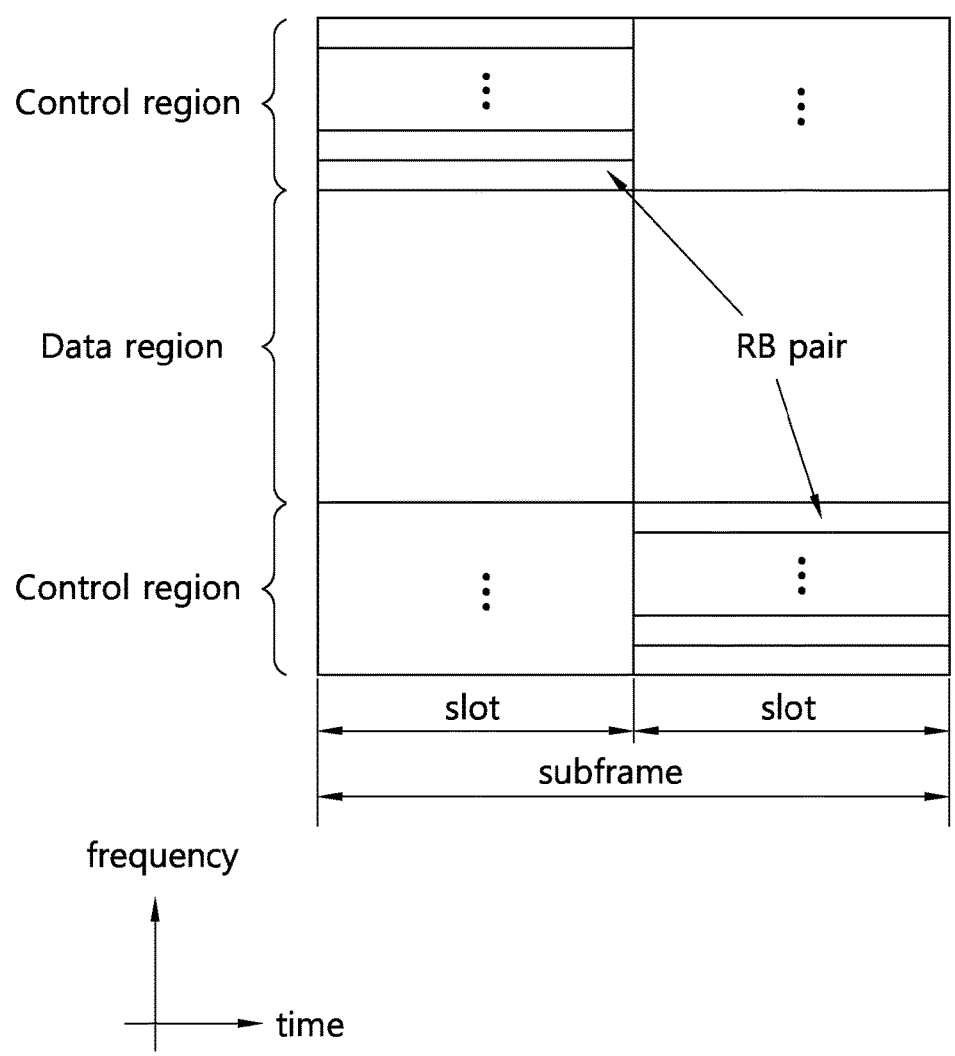
FIG. 3 illustrates a structure of an uplink subframe.

FIG. 3 illustrates a structure of an uplink subframe.

Referring to FIG. 3, the uplink subframe may be divided into control regions and a data region in the frequency domain. A physical uplink control channel (PUCCH) for transmitting uplink control information is allocated to the control regions. A physical uplink shared channel (PUSCH) for transmitting data (control information such as channel status information may also be transmitted together according to circumstances) is allocated to the data region. A terminal may simultaneously transmit a PUCCH and a PUSCH or may transmit any one of the PUCCH and the PUSCH according to a setting.

A PUCCH for a single terminal may be allocated as an RB pair in a subframe 400. Resource blocks belonging to the resource block pair occupy different subcarriers in each of a first slot and a second slot. A frequency occupied by resource blocks belonging to a resource block pair allocated to the PUCCH is changed with respect to a slot boundary. This is called that the RB pair allocated to the PUCCH is frequency-hopped. By transmitting uplink control information through different subcarriers over time, a frequency diversity gain may be obtained.

A highbred automatic repeat request (HARQ) ACK (Acknowledgement)/NACK (Non-acknowledgement) (hereinafter, referred to as ACK/NACK or HARQ-ACK), channel status information (CSI) indicating a downlink channel status, for example, a channel quality indicator, a precoding matrix index (PMI), a precoding type indicator (PTI), a rank indication (RI), and the like, may be transmitted on a PUCCH.

The CQI provides information regarding a link adaptive parameter that can be supported by a terminal over a given time. The CQI may indicate a data rate that can be supported by a downlink channel in consideration of characteristics of a terminal receiver and a signal-to-interference pulse noise ratio (SINR). A BS may determine a modulation (QPSK, 16-QAM, 64-QAM, etc.) and a coding rate to be applied to a downlink channel using the CQI. The CQI may be generated according to various methods. For example, the method may include a method of quantizing a channel status as is and feeding the quantized channel status back, a method of calculating a SINR and feeding the calculated SINR back, and a method of informing about a state actually applied to a channel like a modulation coding scheme (MCS). When the CQI is generated on the basis of MCS, the MCS includes a modulation scheme, a coding scheme, and a corresponding coding rate.

A PMI provides information regarding a precoding matrix in precoding of a codebook base. The PMI relates to a multiple input multiple output (MIMO). Feeding back a PMI in MIMO is called a closed loop MIMO.

The RI is information regarding the number of layers recommended by a terminal. That is, the RI indicates the number of independent streams used for space multiplexing. The RI is fed back only when a terminal operates in an MIMO mode using spatial multiplexing. The RI relates to one or more CQI feedbacks. That is, a feedback CQI is calculated on the assumption of a specific RI value. A rank of a channel is generally changed more slowly than a CQI, and thus, the RI is fed back by the number smaller than that of the CQI. A transmission period of the RI may be a multiple of a CQI/PMI transmission period. The RI is given over the entire system band and frequency-selective RI feedback is not supported.

Periodic channel status information may be transmitted via a PUCCH.

A PUSCH is mapped to an uplink shared channel (UL-SCH), a transport channel. Uplink data transmitted on a PUSCH may be a transport block, a data block for a UL-SCH transmitted during a TTI. The transport block may include user data. Alternatively, the uplink data may be multiplexed data. The multiplexed data may be obtained by multiplexing a transport block for an uplink shared channel (UL-SCH) and channel status information. For example, channel status information multiplexed to data may include a CQI, a PMI, and an RI. Alternatively, the uplink data may include only channel status information. Periodic or aperiodic channel status information may be transmitted via a PUSCH.

Hereinafter, HARQ in 3GPP LTE will be described.

3GPP LTE uses a synchronous HARQ in an uplink transmission and uses an asynchronous HARQ in a downlink transmission. The synchronous HARQ refers to an HARQ in which a retransmission timing is fixed, and the asynchronous HARQ refers to an HARQ in which a retransmission timing is not fixed. That is, in the synchronous HARQ, an initial transmission and retransmission are performed at an HARQ period.

Figure 4:
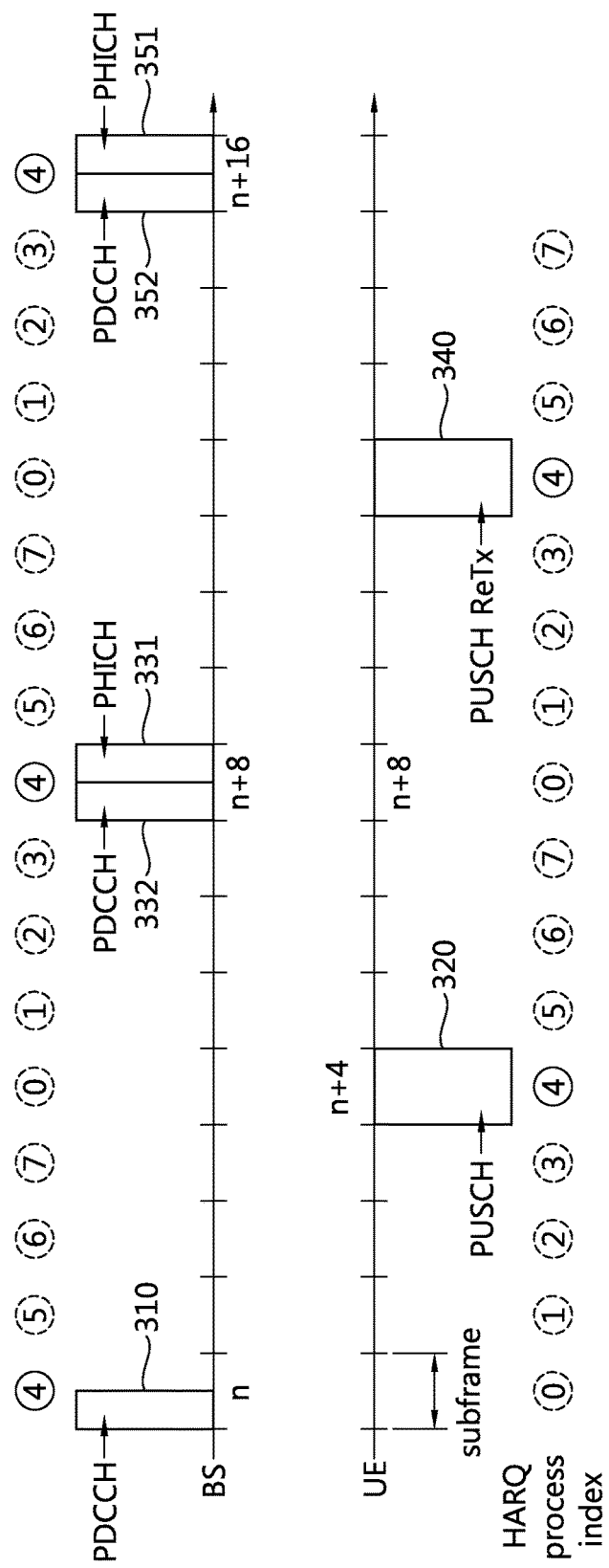
FIG. 4 illustrates uplink synchronous HARQ in 3GPP LTE.

FIG. 4 illustrates uplink synchronous HARQ in 3GPP LTE.

A wireless device receives an initial UL grant on a PDCCH 310 in nth subframe from a BS.

The wireless device transmits a UL transport block on a PUSCH 320 in (n+4)th subframe using the initial UL grant.

The BS transmits an ACK/NACK signal with respect to the UL transport block on a PHICH 331 in (n+8)th subframe. The ACK/NACK signal represents reception acknowledgement with respect to the UL transmission block. Here, the ACK signal represents reception success and the NACK signal represents reception failure. When the ACK/NACK signal is a NACK signal, the BS may transmit a retransmission UL grant on a PDCCH 332, or may not transmit a UL grant. Alternatively, the BS may stop retransmission and may transmit a UL grant for new transmission. In the case of the ACK signal, the BS may transmit a new UL grant on the PDCCH. Also, the BS may transmit a retransmission UL grant. When the UL grant is received, the wireless device disregards the ACK/NACK signal and follows an instruction of the UL grant. This is because, the ACK/NACK signal does not have a CRC and the UL grant has the CRC, and thus, the latter has reliability.

When the UL grant is not received and the NACK signal is received, the wireless device transmits a retransmission block on a PUSCH 340 in (n+12)th subframe. For the transmission of the retransmission block, when the retransmission UL grant is received on the PDCCH 332, the wireless device uses the received retransmission UL grant, and when the retransmission UL grant is not received, the wireless device uses a UL grant which has received previously received with respect to the same HARQ process.

The BS transmits an ACK/NACK signal with respect to the UL transmission block on a PHICH 351 in (n+16)th subframe. When the ACK/NACK signal is a NACK signal, the BS may transmit a retransmission UL grant on a PDCCH 352 or may not transmit a UL grant.

After the initial transmission in the (n+4)th subframe, retransmission is made in (n+12)th subframe, and thus, the synchronous HARQ is performed at the HARQ period of eight subframes.

Thus, in the 3GPP LTE FDD system, eight HARQ processes may be performed, and the HARQ processes are indexed from 0 to 7, respectively.

<Carrier Aggregation>

Hereinafter, a carrier aggregation (CA) system will be described.

Figure 5:
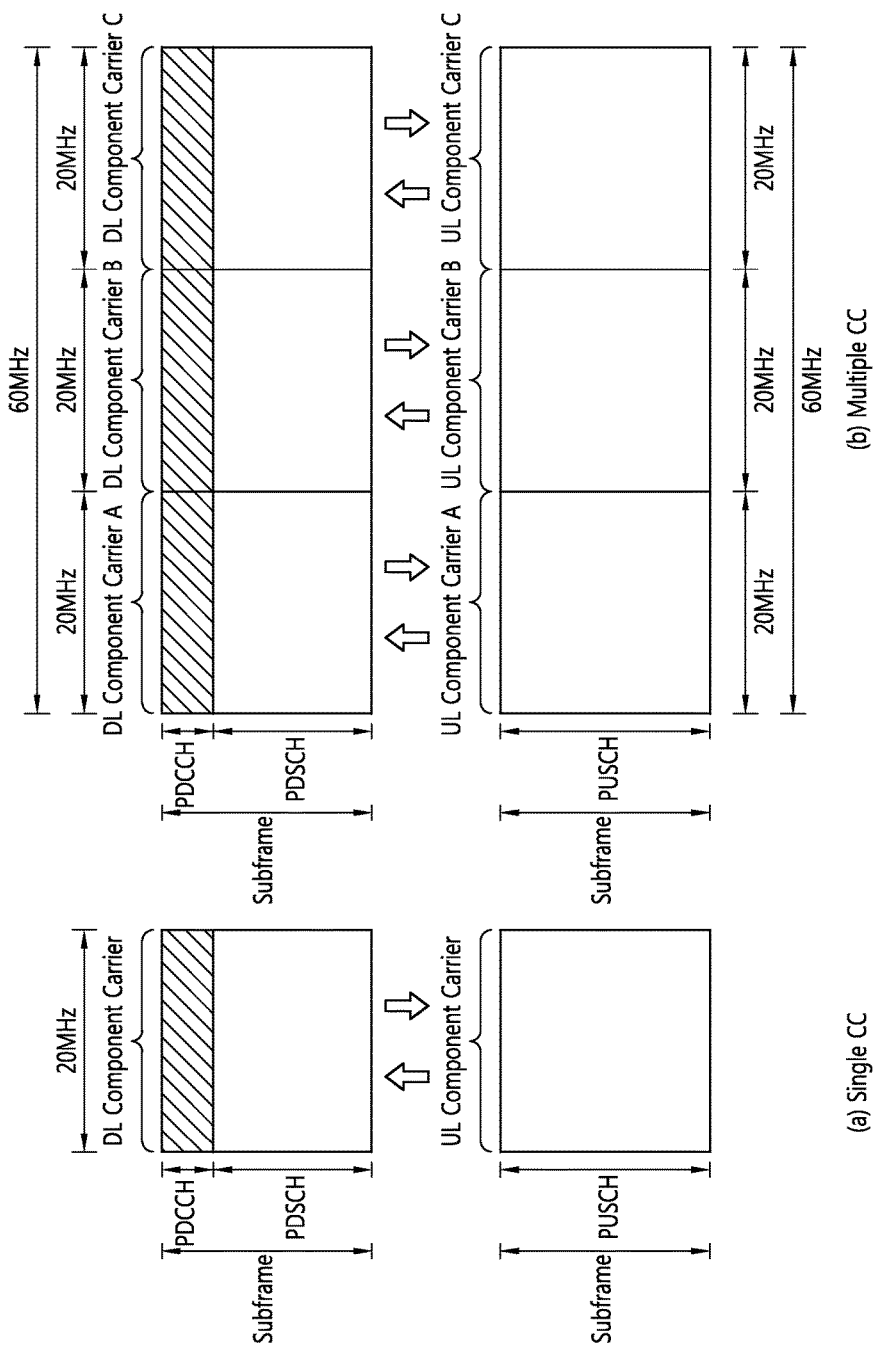
FIG. 5 is a view illustrating a comparison between an existing single carrier system and a CA system.

FIG. 5 is a view illustrating a comparison between an existing single carrier system and a CA system.

Referring to FIG. 5, in the single carrier system, only a single carrier is supported for a terminal in uplink and downlink. A bandwidth of a carrier may vary, but only a single carrier is allocated to a terminal. Meanwhile, in the CA system, a plurality of component carriers (DL CC A to C, UL CC A to C) may be allocated to a terminal. The component carrier (CC) refers to a carrier used in a CA system, and may be simply referred to as a carrier. For example, in order to allocate a bandwidth of 60 MHz to a terminal, three 20 MHz-component carrier may be allocated.

The CA system may be divided into a contiguous carrier aggregation system in which carriers are contiguous and a non-contiguous carrier aggregation system in which carriers are separated from one another. Hereinafter, when the carrier aggregation system is simply referred to as a CA system, it should be understood that the carrier aggregation system includes both a case in which component carriers are contiguous and a case in which component carriers are non-contiguous.

When one or more carriers are aggregated, the carriers to be aggregated may use the same bandwidth as that used in an existing system as is for the purpose of backward compatibility with the conventional system. For example, the 3GPP LTE system supports bandwidths of 1.4 MHz, 3 MHz, 5 MHz, 10 MHz, 15 MHz and 20 MHz, and a 3GPP LTE-A system may configure a broadband equal to or greater than 20 MHz using only the bandwidths of the 3GPP LTE system. Alternatively, the 3GPP LTE may configure a broadband by defining a new bandwidth, rather than using the bandwidth used in the existing system.

A system frequency band of a wireless communication system is divided into a plurality of carrier frequencies. Here, each carrier frequency refers to a center frequency of a cell. Hereinafter, a cell may refer to an downlink frequency resource and an uplink frequency resource. Alternatively, a cell may refer to a combination of a downlink frequency resource and an optional uplink frequency resource. Also, in general, when CA is not considered, uplink and downlink frequency resources may exist as a pair always in a single cell.

In order to transmit and receive packet data through a specific cell, a terminal should first complete configuration on the specific cell. Here, configuration refers to a state in which receiving system information required for data transmission and reception with respect to a corresponding cell has been completed. For example, configuration may include a general process of receiving common physical layer parameters required for data transmission and reception, MAC layer parameters, or parameters required for a specific operation of an RRC layer. A configuration-completed cell is in a state in which packet may be transmitted and received immediately when information indicating that packet may be transmitted is received.

When the cell is in the configuration-completed state, the cell may exist in an activation or deactivation state. Here, activation refers to a state in which data is transmitted or received or in a ready state. In order for a terminal to check resource (frequency or time) allocated thereto, the terminal may monitor or receive a control channel (PDCCH) or a data channel (PDSCH) of an activated cell.

Deactivation refers to a state in which it is impossible to transmit or receive traffic data and it is possible to perform measurement or transmit and receive minimum information. A terminal may receive system information (SI) required for receiving a packet from a deactivated cell. Meanwhile, in order to check resource (frequency or time) allocated thereto, the terminal may not monitor or receive a control channel (PDCCH) and a data channel PDSCH of the deactivated cell.

The cell may be classified into a primary cell, a secondary cell, and a serving cell.

The primary cell refers to a cell operating at a primary frequency and refers to a cell performing an initial connection establishment process or a connection reestablishment process with a BS or a cell indicated as a primary cell during a handover process.

The secondary cell refers to a cell operating at a secondary frequency, and once an RRC connection is established, the secondary cell is set to be used to provide additional radio resource.

The serving cell is configured as a primary cell in case of a terminal which is not configured for CA or which cannot provide CA. When CA is configured, the serving cell indicates a cell configured for a terminal and a plurality of serving cells may be configured. A single serving cell may be configured as a DL CC or as a pair of {DL CC and UL CC}. A plurality of serving cells may include an aggregation of a primary cell and one or a plurality of secondary cells.

A primary component carrier (PCC) refers to a CC corresponding to a primary cell. The PCC is a CC performing a connection or an RRC connection with a BS at an initial stage, among several CCs. The PCC is a special CC which handles a connection or an RRC connection for signaling regarding a plurality of CCs and manages UE context as connection information related to a UE. Also, the PCC is connected to a UE so it is in an RRC connected mode, the PCC exists in an activated state all the time. A DL CC corresponding to a primary cell is called a DL PCC, and a UL CC corresponding to a primary cell is called a UL PCC.

An SCC refers to a CC corresponding to a secondary cell. That is, the SCC is a CC allocated to a UE in addition to a PCC. The SCC, an extended carrier for additional resource allocation to a UE, in addition to a PCC, may be divided into an SCC in an activated state and an SCC in a deactivated state. A DL CC corresponding to a secondary cell is called a DL SCC, and a UL CC corresponding to a secondary cell is called a UL SCC.

The primary cell and the secondary cell have the following features.

First, the primary cell is used for transmission of a PUCCH. Second, the primary cell is constantly activated, while the secondary cell is activated or deactivated according to specific conditions. Third, when the primary cell experiences radio link failure (RLF), RRC reconnection is triggered. Fourth, the primary cell may be changed by a handover procedure accompanying a security key change or a random access channel (RACH) procedure. Fifth, non-access stratum (NAS) information is received through a primary cell. Sixth, in case of an FDD system, a primary cell always includes a pair of DL PCC and UL PCC. Seventh, different CCs may be set as a primary cell in each terminal. Eighth, a primary cell may be replaced only through a handover process and a cell selection/cell reselection process. In adding a new secondary cell, RRC signaling may be used to transmit system information of a dedicated secondary cell.

As for CCs constituting a serving cell, a DL CC may form a single serving cell, or a DL CC and a UL CC may be connected to form a single serving cell. However, a serving cell is not configured only by a single UL CC.

Activation/deactivation of a CC is equal to a concept of activation/deactivation of a serving cell. For example, when it is assumed that a serving cell 1 is configured by a DL CC1, activation of the serving cell 1 refers to activation of the DL CC1. When it is assumed that a serving cell 2 is configured by connecting a DL CC2 and UL CC2, activation of the serving cell 2 refers to activation of DL CC2 and UL CC2. In this context, each CC may correspond to a serving cell.

The number of CCs aggregated between uplink and downlink may variously set. When the number of DL CCs and the number of UL CCs are symmetrical, it is called symmetric aggregation. Also, sizes (namely, bandwidths) of CCs may be different. For example, when five CCs are used to form a 70 MHz band, the five CCS may be configured as 5 MHz CC(carrier #0)+20 MHz CC(carrier #1)+20 MHz CC(carrier #2)+20 MHz CC(carrier #3)+5 MHz CC(carrier #4).

As described above, in the CA system, unlike a single carrier system, a plurality of CCs, namely, a plurality of serving cells, may be supported.

The CA system may support cross-carrier scheduling. The cross-carrier scheduling is a scheduling method capable of allocating resource of a PDSCH transmitted through other CC through a PDCCH transmitted through a specific CC and/or capable of allocating resource of a PUSCH transmitted through a CC other than a CC basically linked to the specific CC. That is, the PDCCH and the PDSCH may be transmitted through different DL CCs, and the PUSCH may be transmitted through a UL CC other than a UL CC linked to the DL CC in which the PDCCH including a UL grant has been transmitted. In this manner, in the system supporting the cross-carrier scheduling, a carrier indicator indicating through which DL CC/ULCC the PDSCH/PUSCH whose control information is provided by the PDCCH are transmitted is required. A field including such a carrier indicator is called a carrier indication field (CIF).

In the CA system supporting cross-carrier scheduling, the CIF may be included in a related art downlink control information (DCI) format. In the system supporting cross-carrier scheduling, for example, in the LTE-A system, since the CIF is added to the existing DCI format (that is, the DCI format used in the LTE), 3 bits may be extended, and the PDCCH structure may reuse an existing coding method or a resource allocation method (that is, CCE-based resource mapping).

[Method for Transmitting Channel Status Information in Wireless Communication System]

In order to maximize utilization of channel capacity given in a wireless communication system, link adaptation is used, and MCS and transmission power are adjusted according to a given channel. In order for a BS to perform link adaption, feedback of channel status information of a UE is required.

1. Channel Status Information (CSI)

For effective communication, channel information is required to be fed back, and channel information of uplink is transmitted through downlink. Channel information indicating a status of a channel refers to channel status information, and channel status information includes a precoding matrix index (PMI), a rank indicator (RI), and a channel quality indicator (CQI).

2. Downlink Transmission Mode

A downlink transmission mode may be classified to nine modes as follows.

Transmission mood 1: Single antenna port, port 0

Transmission mode 2: Transmit diversity

Transmission mode 3: Open loop spatial multiplexing: an open loop mode available for rank adaption based on RI feedback. When a rank is 1, transmit diversity may be applied. When a rank is greater than 1, a large delay CDD may be used.

Transmission mode 4: Closed loop spatial multiplexing or transmit diversity

Transmission mode 5: Transmit diversity or multi-user MIMO

Transmission mode 6: Closed loop spatial multiplexing having transmit diversity or a single transmission layer Transmission mode 7: When the number of PBCH antenna port is 1, a single antenna port (port 0) is used, or otherwise, transmit diversity is used. Or, a single antenna transmission (port 5)

Transmission mode 8: When the number of PGCH antenna ports is 1, a single antenna port (port 0) is used, or otherwise, transmit diversity. Or, dual-layer transmission using antenna ports 7 and 8, or single antenna port transmission using port 7 or port 8.

Transmission mode 9: A maximum of 8-layer transmission (ports 7 to 14)

In case of not an MBSFN subframe, when the number of PBCH antenna ports is 1, a single antenna port transmission (port 0) is used, or otherwise, transmit diversity.

In case of an MBSFN subframe, single antenna portion transmission (port 7)

3. Periodic Transmission of CSI

A CSI may be periodically transmitted via a PUCCH according to a period determined by a higher layer. A UE may be semi-statically set by a higher layer signal such that a differential CSI (CQI, PMI, RI) is periodically fed back via a PUCCH. Here, the UE transmits the corresponding CSI according to modes defined as in the following Table.

TABLE 1

| | | PMI Feedback Type | |
| --- | --- | --- | --- |
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Periodic CSI reporting modes in the PUCCH are supported for each transmission mode described above as follows.

TABLE 2

| Transmission mode | PUCCH CSI reporting modes |
| --- | --- |
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1: When PMI/RI reporting is set for UE |
| | Modes 1-0, 2-0: When PMI/RI reporting is not set for UE |
| Transmission mode 9 | Modes 1-1, 2-1: When PMI/RI reporting is set for UE and the number of CSI-RS ports is greater than 1. |
| | Modes 1-0, 2-0: When PMI/RI reporting is not set for UE and the number of CSI- RS ports is 1. |

4. Periodic Transmission of CSI

A control signal, i.e., an aperiodic CSI request signal, for requesting transmission of a CSI may be included in a scheduling control signal, i.e., a UL grant, with respect to a PUSCH transmitted on a PDCCH. In this case, a UE aperiodically reports a CSI via a PUSCH.

1) Transmission of CQI/PMI/RI through PUSCH after CQI transmission request signal is received In this case, a control signal (CQI request) requesting transmission of a CQI is included in a PUSCH scheduling control signal (UL grant) transmitted on a PDCCH. Table 3 below illustrates modes when the CQI/PMI/RI are transmitted via a PUSCH.

TABLE 3

| | | PMI Feedback Type | | |
| --- | --- | --- | --- | --- |
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The transmission modes of Table 3 may be supported by a higher layer signal transmitted by a BS, and all of CQI, PMI, and RI may be transmitted in a PUSCH of the same subframe. The mode 1-2, mode 2-0, mode 2-2, mode 3-0, and mode 3-1 of Table 3 will be described.

1-1) Mode 1-2

On the assumption that, with respect to each subband, data is transmitted only through a corresponding subband, a precoding matrix is selected. A UE assumes a precoding matrix selected with respect to a system band or a band (which is called a band set S) designated by a higher layer signal and generates a CQI.

The terminal transmits a CQI and a PMI value of each subband. Here, a size of the subbands may vary according to a size of the system band.

1-2) Mode 2-0

A UE selects M number of preferred subbands with respect to the system band or the band (band set S) designated by the higher layer signal. On the assumption that data has been transmitted in the selected M number of subbands, the UE generates a single CQI value. The UE additionally generates a single CQI (wideband CQI) with respect to the system band or the band set S.

In a case in which there are a plurality of codewords with respect to the M number of selected subbands, CQI values for the codewords are defined in a differential manner. It may be obtained such that the differential CQI=index corresponding to a CQI value with respect to M number of selected subbands−wideband CQI index.

The UE transmits information regarding positions of the M number of selected subbands, a single CQI value with respect to the M number of selected subbands, and a CQI value generated with respect to the system band or the band set S. Here, the size of the subbands and the M value may vary according to sizes of the system band.

1-3) Mode 2-2

On the assumption that the UE transmits data through M number of preferred subbands, the UE simultaneously selects positions of the M number of preferred subbands and a single precoding matrix with respect to the M number of preferred subbands.

A CQI value with respect to the M number of preferred subbands is defined for each codeword. The UE additionally generates a wideband CQI value with respect to the system band or the band set S.

The UE transmits information regarding positions of the M number of preferred subbands, a single CQI value with respect to the M number of selected subbands, a single PMI with respect to the M number of preferred subbands, a wideband precoding matrix index, and a wideband CQI value. here, the size of the subbands and the M value may vary according to sizes of the system band.

1-4) Mode 3-0)

The UE generates a wideband CQI value. On the assumption that data is transmitted through each subband, the UE generates a CQI value with respect to each subband. Here, even in case of RI>1, the CQI value indicates only a CQI value with respect to a first codeword.

1-5) Mode 3-1

A single precoding matrix is generated with respect to the system band or the band set S. On the assumption of the generated single precoding matrix with respect to each subband, the UE generates a CQI with respect to the subbands for each codeword. The UE may generate the wideband CQI on the assumption of the single precoding matrix.

The CQI value of each subband is expressed in a differential manner. That is, it may be obtained such that "subband CQI=subband CQI index–wideband CQI index". The size of the subbands may vary according to sizes of the system band.

Hereinafter, the present invention will be described.

In a next-generation wireless communication system, channel status information reporting on more cell/transmission point (TP) may be requested, and as a result, a larger amount of channel status information may need to be transmitted, compared with the related art. In a case in which data and control information such as channel status information are simultaneously transmitted via a PUSCH, resource occupied by the control information in the PUSCH increases, resultantly reducing resource that may be used for transmission of the data in the PUSCH.

Meanwhile, data is transmitted in units of transport blocks (TB), and one or two transmission blocks may be transmitted in a single data channel (PUSCH or PDSCH) according to whether spatial multiplexing utilizing multilayer is applied.

In uplink, a UE determines a size of a transport block. First, a related art method for determining a size of a transport block will be described.

In order to determine a modulation order ($Q_m$) for a PUSCH, redundancy version, and a size of a transport block, a UE reads a "modulation and coding scheme (MCS) and redundancy version" field (hereinafter, referred to as "$I_{MCS}$") within a DCI format. Thereafter, the UE checks a "CSI request" field and calculates a total number (indicated as $N_{PRB}$) of allocated PRG pairs. And then, the UE calculates the number of coded symbols of the control information. The PRB pairs refer to that PRBs of slots are paired to be allocated in two slots. Hereinafter, the PRB pair may be simply referred to as PRB.

For example, in case of $0 \le I_{MCS} \le 28$, the modulation order ($Q_m$) is determined as follows.

When the UE supports 64 quadrature amplitude modulation (QAM) in a PUSCH and is not set to transmit only through quadrature phase shift keying (QPSK) and 16QAM by a higher layer, the modulation order is given by $Q'_m$ of the following table.

TABLE 4

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |

TABLE 4-continued

| MCS Index $I_{MCS}$ | Modulation Order $Q_m$ | TBS Index $I_{TBS}$ | Redundancy Version $rv_{idx}$ |
|---|---|---|---|
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

When the UE cannot support 64 QAM or set to transmit only through QPSK and 16QAM by a higher layer, first, $Q'_m$ is read by Table 4 and the modulation order $Q_m$ is set to min(4, $Q'_m$). min(a,b) indicates a smaller value among a and b.

When a "ttiBundling" parameter provided by a higher layer is set to "true", a size of resource allocation is limited to $N_{PRB} \le 3$ and the modulation order ($Q_m$) is set to 2.

Meanwhile, in case of $29 \le I_{MCS} \le 31$, the modulation order ($Q_m$) is determined as follows.

When a DCI format 0 is used and $I_{MCS}=29$ or when a DCI format 4 is used, only 1 TB is available, $I_{MCS}=29$ for the available TB, and the number of signaled transmission layers is 1, 1) if a CSI request field is 1 bit, the 1 bit is set to trigger aperiodic CSI reporting, and $N_{PRB} \le 4$, 2) if a CSI request field is 2 bits, the 2 bits are set to trigger aperiodic CSI reporting with respect to a single serving cell, and $N_{PRB} \le 4$, or 3) if a CSI request field is 2 bits, the 2 bits are set to trigger aperiodic CSI reporting with respect to two or more serving cells, and $N_{PRB} \le 20$, the modulation order ($Q_m$) is set to 2. In other case, the modulation order is determined from a DCI transmitted in the latest PDCCH including a DCI format 0/4 with respect to a transport block using $0 \le I_{MCS} \le 28$.

If there is no PDCCH including the DCI format 0/4 with respect to a transport block using $0 \le I_{MCS} \le 28$, the modulation order is determined from the latest semi-static scheduling allocation PDCCH 1) when an initial PUSCH for a transport block has been semi-statically scheduled, or determined from a random access response grant for a transport block 2) when the PUSCH has been started by the random access response grant.

The UE determines a redundancy version ($rv_{idx}$) to be used in the PUSCH by using $I_{MCS}$ and Table 4.

Meanwhile, a size of a transport block is determined as follows.

In case of $0 \le I_{MCS} \le 28$, the UE determines a TBS index ($I_{TBS}$) by using $I_{MCS}$ and Table 4.

In case of $29 \leq I_{MCS} \leq 31$, 1) when the DCI format 0 is used and $I_{MCS}=29$, or 2) when the DCI format 4 is used, only one TB is available to be used, $I_{MCS}=29$ for the available TB, and the number of transmission layers is 1, i) if a CSI request field is 1 bit, the 1 bit is set to trigger aperiodic CSI reporting, and $N_{PRB} \leq 4$, ii) if a CSI request field is 2 bits, the 2 bits are set to trigger aperiodic CSI reporting with respect to a single serving cell, and $N_{PRB} \leq 4$, or iii) if a CSI request field is 2 bits, the 2 bits are set to trigger aperiodic CSI reporting with respect to two or more serving cells, and $N_{PRB} \leq 20$, there is no transport block for data (UL-SCH)) and only control information regarding the current PUSCH report mode is transmitted by the UE.

In other case, it is determined from an initial PDCCH with respect to a transport block using $0 \leq I_{MCS} \leq 28$. When there is no PDCCH including the uplink DCI format (DCI format 0/4) with respect to the transport block using $0 \leq I_{MCS} \leq 28$, a size of the transport block is determined from the latest semi-static scheduling allocation PDCCH 1) when an initial PUSCH for the transport block has been semi-statically scheduled, or determined from a random access response grant for the transport block 2) when the PUSCH has been started by the random access response grant.

If a combination of $I_{MCS}=0$ and $N_{PRB}>1$ or a combination of $I_{MCS}=28$ and $N_{PRB}=1$ is signaled, a transport block is disabled in the DCI format 4. In other case, a transport block is enabled.

With respect to $1 \leq N_{PRB} \leq 110$, sizes of a transport block may be given as shown in Table 5 and Table 6 according to ($I_{TBS}$, $N_{PRB}$). Here, Table 5 relates to $1 \leq N_{PRB} \leq 10$, and Table 6 relates to $11 \leq N_{PRB} \leq 20$, and only some of $1 \leq N_{PRB} \leq 110$ are shown for the sake of convenience. For the other remainders, namely, $21 \leq N_{PRB} \leq 110$, tables may be given in the form of Table 5 and Table 6.

TABLE 5

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

TABLE 6

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |

TABLE 6-continued

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

Regarding $1 \leq N_{PRB} \leq 110$, tables for determining sizes of a transport block may be defined according to ($I_{TBS}$, $N_{PRB}$) in the manner of Table 5 and Table 6.

An $I_{TBS}$ value defined in Table 4 may be known according to $N_{PRB}$ and $I_{MCS}$ value, and sizes of the transport blocks in Table 5 and Table 6 may be determined according to ($I_{TBS}$, $N_{PRB}$). A size of a TB is determined in consideration of amounts of resource blocks allocated to the PUSCH or the PDSCH and an MCS applied to allocated resources (specifically, an MCS indicated by $I_{MCS}$).

<Channel Coding, Rate Matching, and Redundancy Version>

In a wireless communication system, a signal is transmitted through a wireless channel, and thus, there is a high possibility of generation of an error. Thus, in order for a receiver to correct an error generated in a wireless channel, a transmitter codes information using an error correction code and transmits the coded information, which is called channel coding. The receiver demodulates a reception signal, performs a decoding process of the error correction code, and subsequently restores the information transmitted from the transmitter. That is, the receiver corrects an error of the reception signal generated in the wireless channel during the decoding process. There are various types of error correction codes, for example, a turbo code.

The turbo code includes a recursive systematic convolution encoder and an interleaver. The turbo code includes an interleaver to facilitate parallel decoding. Interleaving performed by the interleaver is to reduce an influence of a burst error generated when a signal is transmitted in a wireless channel. The interleaver may be, for example, a quadratic polynomial permutation (QPP) interleaver.

Meanwhile, it is known that as a size of a data block increases, performance of the turbo code is better. In an actual communication system, a data block having a predetermined size or greater is divided into several small data blocks and encoded for the convenience of implementation.

The divided data blocks are called code blocks. The code blocks generally have the same size, or one or more of several code blocks may have a different size due to a limitation in a size of a QPP interleaver.

Meanwhile, in a case in which an amount of radio resource used for transmitting a signal is fixed, rate matching may be performed on encoded code blocks to fit to an amount of radio resource. Rate matching may include puncturing or repetition.

Rate matching may be performed in units of the encoded code blocks. Alternatively, rate matching may be performed separately on a systematic portion and a parity portion of an encoded code block.

Figure 6:
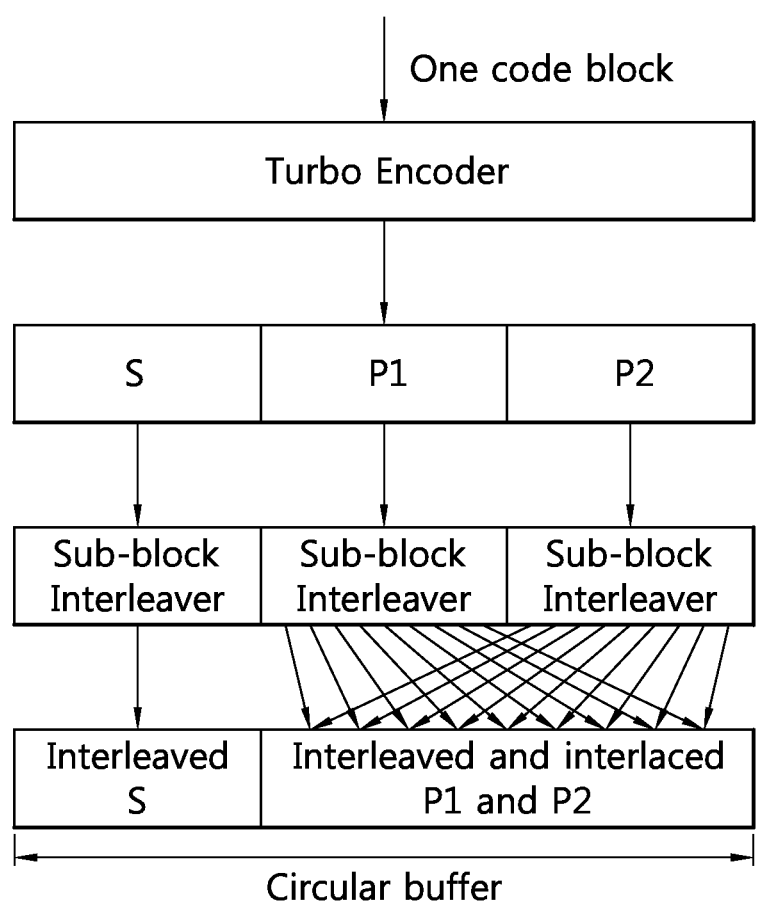
FIG. 6 illustrates an example of rate matching.

FIG. 6 illustrates an example of rate matching.

Referring to FIG. 6, one code block may be divided into a systematic portion S and parity portions P1 and P2 through encoding by a turbo encoder. Thereafter, rate matching may be performed separately on the systematic portion S and the parity portions P1 and P2. In FIG. 6, a code rate is assumed to be 1/3.

Meanwhile, HARQ is a combination of channel coding and automatic repeat request (ARQ) technique. HARQ is a technique of improving decoding performance by retransmitting a data block in which an error has occurred and combining the retransmitted data block with a first transmitted data block.

HARQ may be divided into an asynchronous HARQ scheme and a synchronous HARQ scheme according to regularity of a point in time at which retransmission occurs. In the asynchronous HARQ, a retransmission time is variable, and in the synchronous HARQ, a retransmission time is regularly fixed.

Also, HARQ is divided into a chase combining (CC) scheme and an incremental redundancy (IR) scheme according to types of redundancy version (RV) used in retransmission. Here, the redundancy version may be information indicating a start point of transmission in a circular buffer and may be included in a DCI and transmitted.

Figure 7:
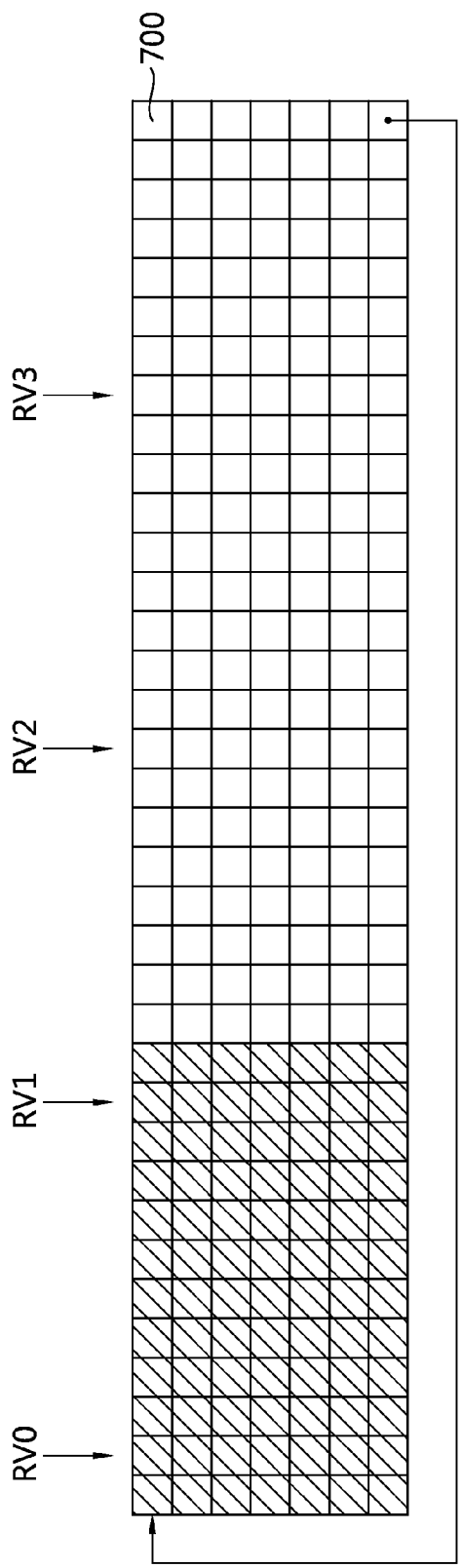
FIG. 7 illustrates an example of defining RVs in a system using a circular buffer.

FIG. 7 illustrates an example of defining RVs in a system using a circular buffer.

Referring to FIG. 7, RV 0, RV 1, RV 2, and RV 3 indicate transmission start points in the circular buffer 700. Four RVs are illustrated, for example. Intervals between positions indicated by the RVs in the circular buffer may be obtained by dividing a size of the entire circular buffer by the number of RVs.

When it is assumed that a code rate of the turbo code is 1/3, a front 1/3 portion of the circular buffer 700 is a systematic portion and a rear 2/3 portion may be a parity portion.

A CC scheme is a scheme of obtaining a gain of a signal-to-noise ratio (SNR) by retransmitting the same data block as that of a first transmitted data block. This may be a case in which the redundancy version retransmits the same data block.

Meanwhile, the IR scheme is a scheme of obtaining a coding gain by transmitting a data block including a redundancy version different from that of a previous data block transmission. In the IR scheme, when decoding is attempted by combining a retransmitted data block with a previously received data block, better decoding performance tend to be obtained when the retransmitted data block does not overlap the previous data block. Thus, when the circular buffer is used and the number of RVs is 4, when the RVs are in order of RV 0, RV 2, RV 3, RV 1 or RV 0, RV 2, RV 1, RV 3, good performance is obtained.

When HARQ is applied to a system employing rate matching using the circular buffer, RVs may designate transmission start points of data blocks mainly in the circular buffer to implement an IR scheme. Here, start points should be defined by the number of RVs in the circular buffer.

Meanwhile, in transmitting a data block, signaling indicating whether the currently transmitted data block is a new data block is required, and it is called a new data indicator (NDI). A signaling scheme of explicitly indicating an NDI and the currently transmitted RVs is possible.

In the synchronous HARQ, both transmission/reception ends points know points in time at which data blocks are transmitted, and thus, a retransmission sequence number (RSN) may be used instead of NDI. A specific value of an RSN may be previously determined to indicate an initial transmission. For example, value 0 of RSN may indicate initial transmission. When the RSN is expressed by 2 bits, the RSN may be transmitted in order of 0, 1, 2, and 3, and after fourth transmission, the RSN may be maintained as 3.

Hereinafter, the present invention will be described.

In a next-generation wireless communication system, machine-type-communication (MTC) terminals may be used. The MTC terminals refer to low-priced/low specification terminals focusing on data communication such as reading a meter, measuring a water level, utilizing a monitoring camera, and reporting vending machine inventory.

Also, in the next-generation wireless communication system, throughput of an overall system may be increased by increasing frequency reuse of the overall system by disposing a greater amount of small cells. Also, in the next-generation wireless communication system, efforts to increase cell coverage and effectively utilize resource by using coordinated multiple point transmission and reception: CoMP has been made.

A basic method of increasing cell coverage is repeatedly transmitting a data channel.

Figure 8:
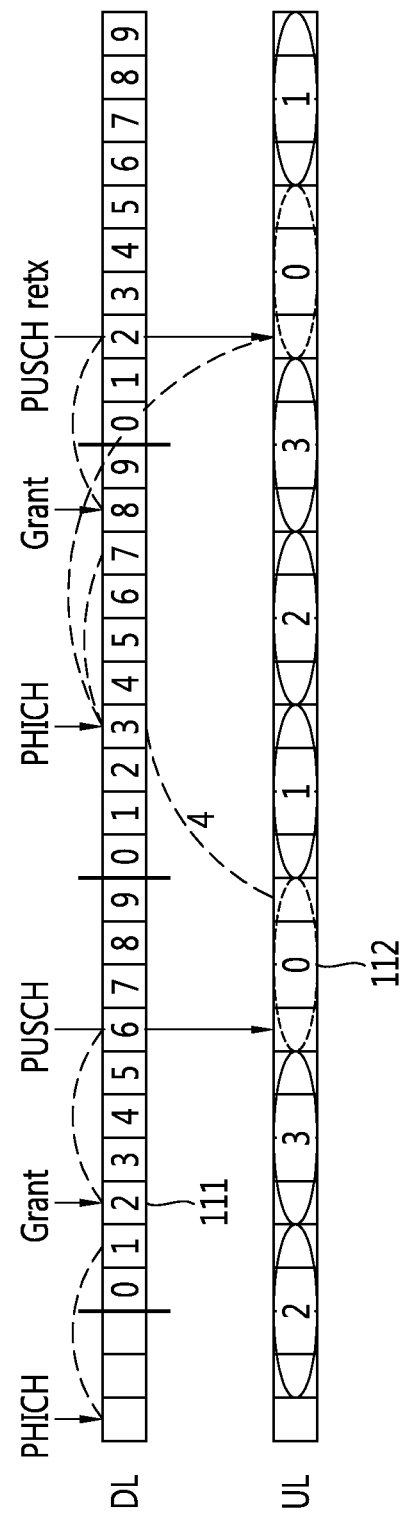
FIG. 8 is a view illustrating an example of a method of repeatedly transmitting a data channel.

FIG. 8 is a view illustrating an example of a method of repeatedly transmitting a data channel.

Referring to FIG. 8, a UE may receive UL grant in a DL subframe 111. The UE may perform uplink transmission based on the UL grant in a subframe interval 112 including a plurality of UL subframes. Such a transmission scheme is called subframe bundling.

The subframe interval 112 may include, for example, four UL subframes. The subframe interval 112 may start from a UL subframe after four subframes from the DL subframe 111.

The UE may continuously transmit data by the same HARQ process. In this case, a BS, a receiver, may have an effect of increasing energy per information bit included in the data.

<Energy of Reference Signal and Resource Allocation>

Under the same error requirements, an operation SINR varies depending on the number of information bits included in data, and energy distribution efficiency regarding a reference signal and data required for channel estimation varies depending on the operating SINR. A reference signal is a signal used for channel estimation for demodulation of data into a signal known in a transmitter and a receiver or channel estimation for scheduling. For example, the same precoding as that of data may be applied to a demodulation reference signal (DM-RS), a reference signal for demodulation of data, to transmit the same. A sounding reference signal (SRS) may be used for channel estimation for scheduling data into a reference signal not associated with a PUSCH or a PUCCH. Hereinafter, a reference signal may be the DM-RS but the present invention is not limited thereto. In a low SINR, more resource may need to be allocated to a reference signal for channel estimation, and in a high SINR, allocation of only minimum resource may be sufficient for a reference signal for channel estimation.

The present invention proposes a method for adaptively adjusting an energy distribution rate between data and a reference signal according to the number of information bits transmitted through an uplink data channel.

Figure 9:
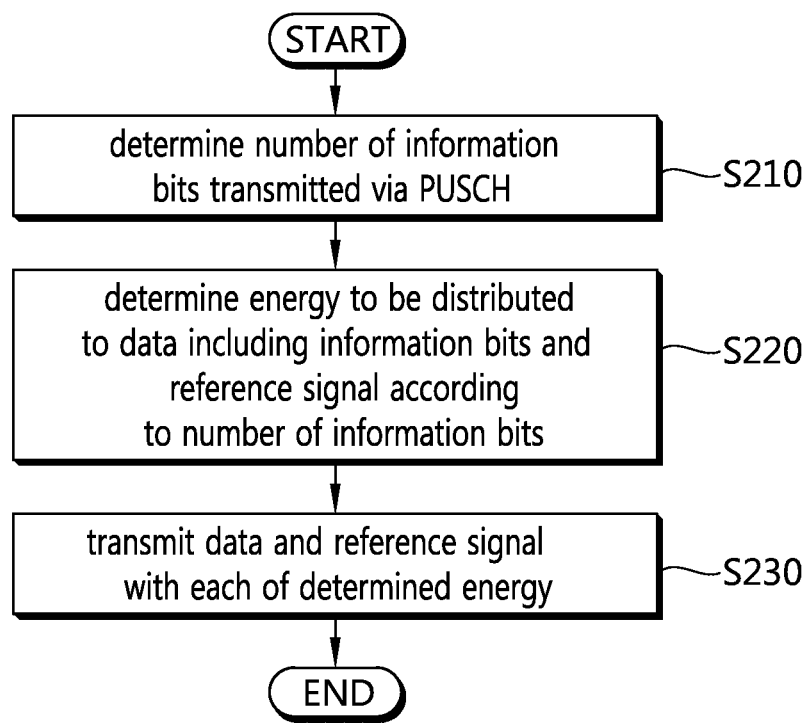
FIG. 9 is a view illustrating a data transmission method for a UE according to an embodiment of the present invention.

FIG. 9 is a view illustrating a data transmission method for a UE according to an embodiment of the present invention.

Referring to FIG. 9, a UE determines the number of information bits transmitted via a PUSCH (S210).

The UE determines energy to be distributed to data including the information bits and the reference signal according to the number of the information bits (S220).

The terminal transmits the data and the reference signal with each of the determined energy (S230).

Hereinafter, each process will be described in detail.

First, the number of information bits may be determined by a transport block size (TBS). In detail, the number of information bits may be determined according to a combination of an index $I_{TBS}$ for determining the TBS, the number of resource blocks, and a modulation order. Alternatively, the number of information bits may be determined to include the number of CRC bits together with the TBS.

When subframe bundling is used, a PUSCH may be transmitted through a plurality of subframes. Energy with respect to the information bits may be accumulated according to the number of bundled subframes. Thus, the number of effective information bits transmitted in one subframe of the bundled subframes may be determined to be in proportion to a total number of scheduled information bits or the number of bundled subframes.

Energy distributed to the data including information bits and the reference signal may be determined as follows.

For example, the number of information bits and energy distributed to the reference signal may be set to be in inverse proportion. That is, it may be set such that when the number of information bits increases, energy allocated to the reference signal is lowered, and when the number of information bits decreases, energy allocated to the reference signal increases.

Meanwhile, a method for increasing energy distributed/allocated to a reference signal may include 1) a method of increasing transmission power in a resource in which a reference signal is transmitted or 2) a method of increasing the number of resources in which a reference signal is transmitted. That is, hereinafter, the meaning of increasing energy distributed to a reference signal should be understood to include at least one of 1) and 2).

In case of downlink, a reference signal may be disposed in a specific resource element (RE) and transmission power of the resource element may increase, but in case of uplink, since SC-FDMA has been introduced for single carrier characteristics, a reference signal is allocated in units of OFDM symbols. Thus, resources in which a reference signal is transmitted may be increased in units of OFDM symbols. In this case, the number of information bits and the number of OFDM symbols used for transmission of a reference signal may be in inverse proportion.

Also, in order to increase energy distributed to the reference signal, mapping of data with respect to resource elements included in an OFDM symbol to which a reference signal is mapped to increase energy distributed to a reference signal may be limited.

Meanwhile, when subframe bundling is applied, energy distributed to a reference signal may be determined in consideration of the number of bundled subframes as a parameter, as well as the number of information bits. For example, as the number of information bits is reduced and as the number of bundled subframes is reduced, a distribution amount of energy of the reference signal and the number of resources of the reference signal may increase. That is, the distribution amount of energy of the reference signal and the number of resources of the reference signal may be adaptively modified according to a combination of the entirety or a portion of the parameter or a single parameter. Also, a method of dividing the parameter values into predetermined intervals and determining an energy value distributed to a reference signal according to in which of the intervals the parameter values are included may also be used. In another example, in case of existing subframe bundling, subframe bundling is applied with four subframes, and in this case, the number of resources of a reference signal is not changed. For backward compatibility, the same number of reference signals as that of the existing case may be applied to the subframe bundling including four subframes, and the number of resources of a reference signal may be changed only in case of subframe bundling including five or more subframes.

Whether to apply the method of setting energy distributed to a reference signal such that the energy is in inverse proportion to the number of information bits may be determined according to an effective code rate value. The effective code rate refers to a value obtained by the number of information bits by the number of coded bits transmitted in bundled subframes. The information bits are channel-coded, and during the channel coding, bits coded at a mother code rate are generated. For example, when information bits are N bits and a mother code rate is 1/3, the coded bits are 3N bits. The coded bits are rate-matched according to available resources by using a circular buffer. Here, the method may be applied only when the effective code rate is smaller than the mother code rate (or a specific threshold value) or when the entirety of circular buffer is received (or the entire reception is repeated by a predetermined number of times or greater). The specific threshold value may be previously determined or signaled. The number of resources allocated to a reference signal when the subframe bundling is set may be set to RRC or may be designated during scheduling. Here, in case of downlink, limited buffer rate matching (LBRM) may be applied in consideration of a size of a soft bit buffer of a receiver, and in this case, a circular buffer may be configured only with a portion, rather than the entirety, of the coded bits generated in the mother code rate. Also, in case of carrier aggregation (CA), the size of a circular buffer of a transmitter and a size of a circular buffer of a receiver may be configured to be different, and the scheme in which the circular buffer is used as a reference may be applied according to the size of a buffer of the transmitter or a size of the buffer of the receiver.

The number of resources allocated to a reference signal may be set to gradually increase or decrease within a interval of bundled subframes. For example, it is assumed that an available reference signal density aggregations are R1, R2, and R3. Here, it is assumed that the number of subframes of the subframe-bundled subframe interval is 10. Then, R1, R2, R3, R1, R2, R3, . . . , R1 may be sequentially transmitted from a first subframe. According to this method, even when all of subframes have not been received, a probability that data decoding is successful may increase.

In the above, the uplink has been illustrated, but the present invention is not limited thereto and may also be applied to downlink. In case of downlink, the number of resources to which a reference signal is allocated may be adaptively determined. Here, an error rate of a CQI report should be considered.

<Format or Spreading Factor Adaptation>

In the above, the method for determining energy distributed to a reference signal according to the number of information bits has been described, but this method may also be similarly applied to determine a spreading factor according to the number of information bits.

Figure 10:
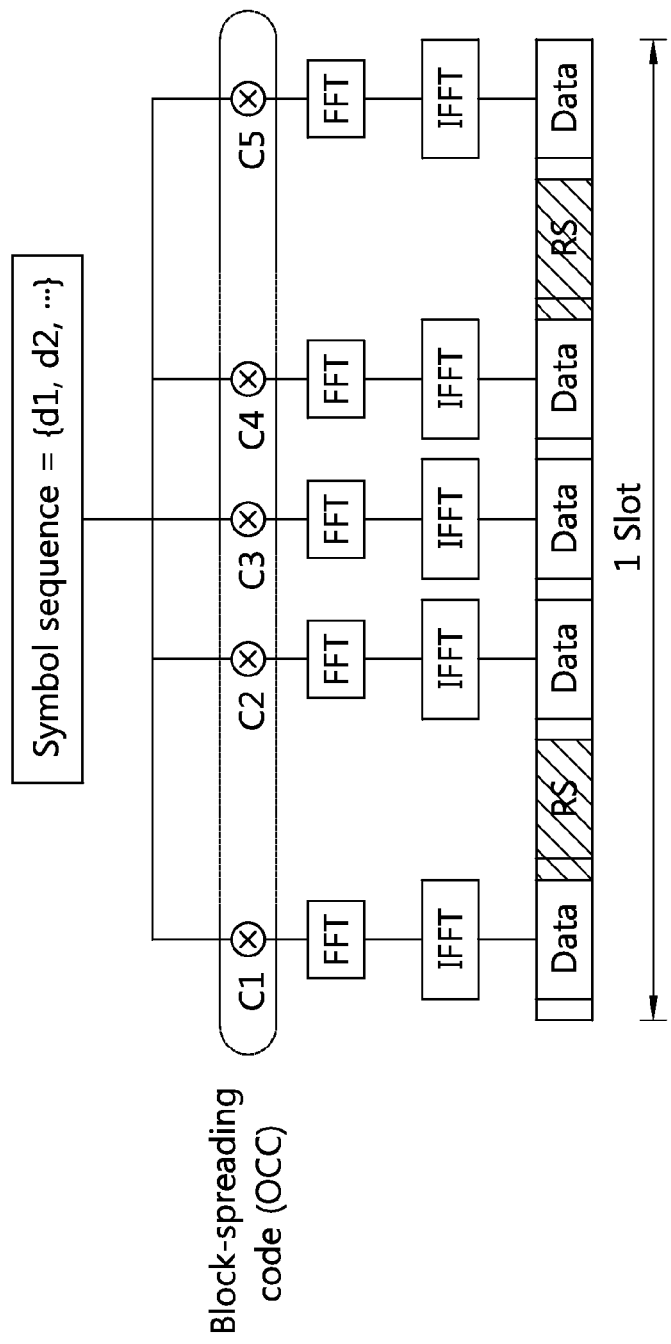
FIG. 10 illustrates a channel structure of PUCCH format 3.

FIG. 10 illustrates a channel structure of PUCCH format 3.

Referring to FIG. 10, PUCCH format 3 is a PUCCH format using a block spreading scheme. The block spreading scheme refers to a method of spreading a symbol sequence obtained by modulating a multibit ACK/NACK in the time domain by using a block spreading code.

In the PUCCH format 3, a symbol sequence (for example, ACK/NACK symbol sequence) is spread and transmitted in the time domain by a block spreading code. As the block spreading code, an orthogonal cover code (OCC) may be used. Control signals of several UEs may be multiplexed by the block spreading code. In PUCCH format 2, symbols transmitted in each data symbol are different and UE multiplexing is performed using a cyclic shift of a constant amplitude zero auto-correlation (CAZAC) sequence, and in PUCCH format 3, a symbol sequence including one or more symbols is transmitted over the frequency region of each data symbol and spread in the time domain by a block spreading code to perform UE multiplexing. In FIG. 10, a case of using two reference signal (RS) symbols in one slot is illustrated, but the present invention is not limited thereto and three RS symbols may be used and an orthogonal cover code having 4 may also be used as a spreading factor value. The RS symbols may be generated from a CAZAC sequence having a specific cyclic shift, and may be transmitted in the form in which a specific orthogonal cover code is multiplied to a plurality of RS symbols of the time domain.

In case of PUCCH, a reference signal may be orthogonally multiplexed on the same resource block by using a CS of a CAZAC sequence or by using an orthogonal cover code.

In case of PUSCH, a reference signal uses a CAZAC sequence and reference signals may be orthogonally multiplexed on the same resource block through cyclic shift. However, data uses spatial multiplexing, and this may not be available according to a channel situation and orthogonality may not be guaranteed.

In an existing PUSCH structure, when subframe bundling is applied, if an effective code rate of the PUSCH is considerably lower than a mother code rate, it may not be effective to perform sequential repetition according to a redundancy version (RV) of a circular buffer.

For example, in a case in which 16 bits is transmitted as a TBS, 24-bit CRC is added, extending information bits to 40 bits. In a case in which a mother code rate is 1/3, 120 bits are stored in the circular buffer, and when 120 bits are transmitted to a resource block pair per subframe during 10 subframes, coded bits are 288 bits per resource block pair and 2880 bits may be transmitted in a total of ten subframes. Thus, an effective code rate is 40/2800=1/72. And the bits may be repeatedly coupled by 24 (=2880120) times in the circular buffer.

Meanwhile, similarly to the foregoing PUCCH format 3, an orthogonal code may be applied to six OFDM symbols of each slot of a PUSCH and 24 bits may be transmitted in each slot, namely, a total of 48 coded bits may be transmitted in two slots. In this case, 48 bits are repeated six times in each subframe, and thus, an effective code rate may be 40/(480*6)=1/72 during a total of 10 subframes. Although the effective code rate is the same as described above, the bits may be repeatedly coupled to the circular buffer four times (=480/120). When an orthogonal code is added, six resources may be orthogonally discriminated, and thus, capability of orthogonally multiplexing the same frequency resource may increase to 6.

When only one subframe is transmitted without applying subframe bundling in the foregoing conditions, an effective code rate of the PUSCH may be 4/288 and repetition of the circular buffer is 288/120, greater than 2, and when an orthogonal code is applied to the PUSCH, an effective code rate is 40/(48*6) and repetition of the circular buffer is 48/120, which cannot transmit the entire bits coded at the mother code rate. In the latter case, multiplexing capability may increase but a coding gain cannot be sufficiently obtained. Thus, it is required to apply an orthogonal code cover or adaptively apply a spreading factor of an orthogonal code cover.

That is, in a case in which the number of information bits is large, the spreading factor is lowered (or the orthogonal code cover is not applied), and when the number of information bits is small, the spreading factor increases (or the orthogonal code cover is applied). That is, the number of information bits and the spreading factor are applied in an inverse proportional relation. The spreading factor may be discriminated by a format of an uplink data transmission channel. A PUSCH/PUCCH format series may be adaptively selected.

The number of information bits may be determined by a TBS. The number of information bits may be set according to a combination of parameters such as $I_{TBS}$ determining a TBS and the number of resource blocks. A CRC may also be considered together with the TBS. The spreading factor may be set according to a combination of the parameters.

Transmission and repetition of all of the coded bits of the circular buffer may vary according to the number of bundled subframes as well as the number of information bits. Thus, the number of effective information bits transmitted in one subframe may be a value obtained by dividing the number of scheduled information bits by the number of bundled subframes. The spreading factor may be in inverse proportion to the number of effective information bits or may be in proportion to the number of bundled subframes.

In other words, whether to apply the spreading factor or the orthogonal code cover may be adaptively changed according to parameters such as the number of information bits and the number of bundled subframes. For example, as the number of information bits is reduced and as the number of bundled subframes is reduced, the spreading factor may increase. The value of the spreading factor may be adaptively changed according to a combination of a portion or the entirety of the parameters, and may be determined according to an interval of the value.

The foregoing method may be applied only to a case in which the entirety of the circular buffer is received during a bundled subframe interval in consideration of the fact that a coding gain cannot be obtained unless the entirety of the circular buffer is received. This may be limited by a threshold value, or the like, and the threshold value may be previously determined or signaled. While the subframe bundling is configured, the spreading factor may be set by the RRC or included in scheduling information.

The value of the spreading factor may be set to gradually increase or decrease within a subframe bundling interval. For example, when available spreading factor values are S1, S2, and S3, the spreading factor value may be set such as S1, S2, S3, S1, S2, . . . , S1 within bundled subframes. Then, data may be decoded before the entirety of the bundled subframes are received.

<Modulation Scheme Application Method>

In the related art QPSK has been used as a symbol modulation scheme of the PUSCH and the PUCCH. BPSK has a better symbol error rate (SER) than that of QPSK, but bit error rate (BER) characteristics of BPSK and QPSK are equal. Thus, it is more helpful for performance to transmit more coded bits by using QPSK than reducing the SER by using BPSK.

Here, in a case in which the entire coded bits of the circular buffer can be received, since a coding gain is not additionally generated, it is more advantageous to use BPSK. Thus, as a modulation scheme, BPSK and QPSK may be selectively used, rather than using QPSK all the time.

That is, in a case in which the number of information bits is large, QPSK is used, and when the number of information bits is small, BPSK may be used. The number of information bits and a modulation order may be set to have a proportional relationship. Selection of BPSK and QPSK may be discriminated by a format of an uplink data transmission channel, and PUSCH/PUCCH format series may be adaptively selected.

Whether to transmit and repeat all the coded bits of the circular buffer may vary according to the number of bundled subframes as well as the number of information bits. Thus, the number of effective information bits transmitted in one subframe may be a value obtained by dividing the number of scheduled information bits by the number of bundled subframes. Here, the modulation order may be in proportion to the number of effective information bits or may be in inverse proportion to the number of bundled subframes.

In other words, the modulation order may be adaptively changed according to the number of information bits and the number of bundled subframes as parameters. As the number of information bits is small and as the number of bundled subframes is small, the modulation order is reduced. The modulation order may be adaptively changed according to a combination of the parameters or a combination of some of the parameters or one parameter value, and a value of the modulation order may be determined according to sections of values of the parameters.

When the entire circular buffer is not received, a coding gain cannot be obtained. Thus, BPSK may be applied only when the entire circular buffer is received during the bundled subframe interval. This may be limited by a threshold value, and the threshold value may be included in an RRC or scheduling information.

The UE may gradually increase or decrease the modulation order in the interval of the bundled subframes. For example, when the modulation order is B1, B2, the modulation order may be applied as B1, B2, B1, B2, . . . , B2 during the subframe bundling interval including ten subframes. A receiver may decode data before receiving all of the bundled subframes.

<Redundancy Version Application Method>

In subframe bundling, a start point of a coded bit on a circular buffer transmitted in each subframe is determined by a previously agreed RV. The RV may be set by quadrisecting the circular buffer and may be repeated in order of RV0>RV2>RV 3>RV 1.

For example, when a 136-bit TB is scheduled, it includes a 24-bit CRC, and when a mother code rate is 1/3, 160*3=480 bits are stored in the circular buffer. When the RV is determined by quadrisecting the circular buffer as in the related art, an interval between RVs is 120 bits. When 288 bits can be transmitted like the existing PUSCH, even though an RV is set as a start point in each UL subframe, coded bits overlap between RVs, and thus, the entire coded bits of the circular buffer may be received through retransmission based on subframe bundling.

Meanwhile, when 48 bits can be transmitted as in PUCH format 3, only a number of bits smaller than the RV interval (120 bits) is transmitted, bits, 120–48=72 bits, between two different RVs cannot be transmitted by repeatedly applying subframe bundling. Thus, the coded bits based on the mother code rate may not be utilized and loss occurs in a coding gain.

Thus, it is required to adaptively change a setting of RVs or a coded bit transmission start position of each subframe.

In order to change a setting of RVs, the following method may be applied.

1. The number of RVs may be adjusted, 2. An interval between RVs may be adjusted, or 3. Continuously coded bits may be transmitted. A start position of a coded bit of a subsequent subframe may be set by a value obtained by applying an offset to a finally coded bit of a circular buffer transmitted in a previous subframe. In the related art, the RVs are set at fixed positions, but the contents of paragraph 3 may be RV setting to transmit continuously coded bits on the circular buffer.

4. An offset is applied to existing RVs. For example, an offset is applied to an RV after transmission of one period of the RV.

When the number of information bits is smaller, it is divided by a larger number of RVs and applied, and when the number of information bits is greater, it is divided by a smaller number of RVs. That is, the number of information bits and the number of RVs may be set to be proportional to each other. Adjustment of the number of RVs may be discriminated by formats of uplink data transmission channel. The adjustment of the number of RVs may be adaptively selected according to PUSCH/PUCCH format series.

In the following descriptions, only the number of RVs is mentioned, but it may also be applied to an interval between RVs and the paragraphs 3 and 4 according to equally dividing the circular buffer according to the number of RVs.

Since transmission and repetition of all the coded bits of the circular buffer vary according to the number of bundled subframes as well as the number of information bits, the number of effective information bits transmitted in one subframe may be a value obtained by dividing the number of scheduled information bits by the number of bundled subframes. The number of RVs may be set to be in proportion to the number of effective information bits or may be set to be in inverse proportion to the number of bundled subframes.

The number of RVs may be adaptively changed according to the number of information bits and the number of bundled subframes as parameters. As the number of information bits is small and as the number of bundled subframes is small, the number of RVs may be reduced. The number of RVs may be determined according to a combination of the entirety or a portion of the parameters, and may be determined by sections of the parameter values.

When the entire circular buffer is not received, a coding gain cannot be obtained. Thus, the number of RVs may be increased only when the entire circular buffer is received during the interval of bundled subframes. A threshold value may be determined to set the number of RVs. The number of RVs may be set when subframes are bundled or according to RRC or scheduling information.

Meanwhile, the number of RVs may be gradually increased or decreased within the subframe bundling interval. This is advantageous in that data can be decoded before the entire bundled subframes are received.

Selection of RVs may be configured such that the same RV is repeated and a next RV is transmitted. For example, RV=0 may be repeated four times, RV=2 may be repeated, RV=3 may be repeated, and thereafter, RV=1 may be repeated.

Transmission of the same data form in continuous subframes is advantageous when an orthogonal code cover is applied between subframes. When a channel is changed during a section in which an orthogonal code is applied, orthogonality is degraded, and thus, the orthogonal code may be applied when a channel is rarely changed.

RVs and {the number of spreading factors, reference signal density, modulation order} may be matched and transmitted as a matched set.

Figure 11:
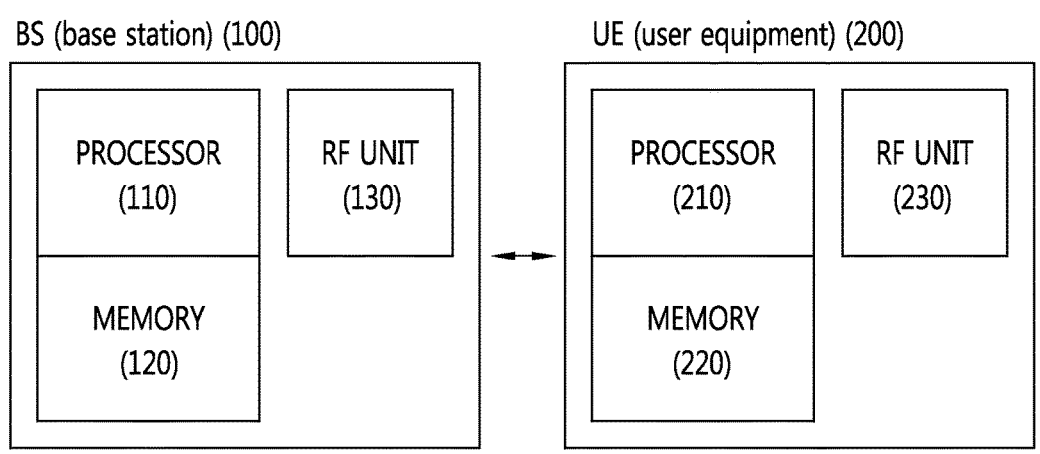
FIG. 11 illustrates a block diagram of a base station and a terminal according to an embodiment of the present invention.

FIG. 11 is a block diagram of a base station and a terminal according to the embodiments of the present invention.

A base station 100 includes a processor 110, a memory 120 and a radio frequency (RF) unit 130. The processor 110 implements the proposed functions, processed, and/or methods. The memory 120 is connected to the processor 110 and configured to store various information used for the operations for the processor 110. The RF unit 130 is connected to the processor 110 and configured to transmit and/or receive a radio signal.

A UE 200 includes a processor 210, a memory 220, and a RF unit 230. The processor 210 implements the proposed functions, processed, and/or methods. For example, the processor 210 may determine the number of information bits transmitted via a physical uplink shared channel (PUSCH), and determine energy to be distributed to each of data including the information bits and a reference signal according to the number of information bits. And the processor 210 transmits the data and the reference signal with each of the determined energy. The memory 220 is connected to the processor 210 and configured to store various information used for the operations for the processor 210. The RF unit 230 is connected to the processor 210 and configured to transmit and/or receive a radio signal.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A data transmission method for a terminal in a wireless communication system, the data transmission method comprising:
   receiving an uplink grant in a downlink subframe, wherein the uplink grant schedules a plurality of uplink subframes which are consecutive in a time domain;
   determining a number of information bits to be transmitted via a physical uplink shared channel (PUSCH);
   determining a spreading factor based on the number of information bits;
   mapping data including the information bits and a reference signal to single carrier-frequency division multiple access (SC-FDMA) symbols in an uplink subframe based on the spreading factor, wherein a number of SC-FDMA symbols to which the data are mapped is dependent on the spreading factor;
   determining energy to be distributed to each of the data including the information bits and the reference signal; and
   transmitting the data and the reference signal with each of the determined energy in each of the plurality of uplink subframes based on the uplink grant,
   wherein the spreading factor is inversely proportional to the number of information bits,
   wherein, in the plurality of uplink subframes, the same data and reference signal are repeatedly transmitted, and
   wherein energy distributed to the reference signal is inversely proportional to a number of the plurality of uplink subframes.

2. The data transmission method of claim 1, wherein when the energy determined to be distributed to the reference signal increases, the number of resource elements to which the reference signal is mapped is increased.

3. The data transmission method of claim 1, wherein when the energy determined to be distributed to the reference signal increases, transmission power of each of the resource elements to which the reference signal is mapped is increased.

4. The data transmission method of claim 1, wherein the number of information bits is determined on the basis of a size of a transport block transmitted via the PUSCH.

5. A terminal comprising:
   a radio frequency (RF) unit that transmits and receives a wireless signal; and
   a processor connected to the RF unit, that:
   controls the RF unit to receive an uplink grant in a downlink subframe, wherein the uplink grant schedules a plurality of uplink subframes which are consecutive in a time domain,
   determines a number of information bits to be transmitted via a physical uplink shared channel (PUSCH),
   determines a spreading factor based on the number of information bits,
   maps data including the information bits and a reference signal to single carrier-frequency division multiple access (SC-FDMA) symbols in an uplink subframe based on the spreading factor, wherein a number of SC-FDMA symbols to which the data are mapped is dependent on the spreading factor,
   determines energy to be distributed to each of the data including the information bits and the reference signal according to the number of information bits, and
   control the RF unit to transmit the data and the reference signal with each of the determined energy in each of the plurality of uplink subframes based on the uplink grant,
   wherein the spreading factor is inversely proportional to the number of information bits,
   wherein, in the plurality of uplink subframes, same data and reference signal are repeatedly transmitted, and
   wherein energy distributed to the reference signal is inversely proportional to a number of the plurality of uplink subframes.

* * * * *